US011964372B1

(12) United States Patent
Wang

(10) Patent No.: US 11,964,372 B1
(45) Date of Patent: Apr. 23, 2024

(54) IN-LINE CLAMP

(71) Applicant: Henry Wang, Winter Springs, FL (US)

(72) Inventor: Henry Wang, Winter Springs, FL (US)

( * ) Notice: Subject to any disclaimer, the term of this patent is extended or adjusted under 35 U.S.C. 154(b) by 0 days.

(21) Appl. No.: 18/398,734

(22) Filed: Dec. 28, 2023

(51) Int. Cl.
*B25B 5/00* (2006.01)
*B25B 5/02* (2006.01)

(52) U.S. Cl.
CPC .................................... *B25B 5/02* (2013.01)

(58) Field of Classification Search
CPC .... B25B 5/00; B25B 5/02; B25B 5/04; B25B 1/00; B25B 1/02
See application file for complete search history.

(56) References Cited

U.S. PATENT DOCUMENTS 2,637,249 A * 5/1953 Swenson .................. B25B 5/10 269/134
4,805,888 A * 2/1989 Bishop ..................... B25B 5/08 269/235
5,310,299 A * 5/1994 Bernstein ............... F16B 5/025 269/229
5,641,257 A * 6/1997 Bernstein ............... F16B 5/025 269/232
5,718,420 A * 2/1998 Bernstein ................. B25B 5/08 269/157
5,833,225 A * 11/1998 Weber ...................... B25B 5/08 269/229
5,961,108 A * 10/1999 Weber ...................... B25B 5/10 411/354
9,393,656 B1 * 7/2016 Weber .................... B23Q 3/103
2015/0336241 A1 * 11/2015 Engibarov ............ B25B 1/2405 269/282

OTHER PUBLICATIONS

Etsy; CNC Toe Clamp Hold Down Files with Fixture Accessories; Jan. 2, 2024; https://www.etsy.com/listing/1285796294/cnc-toe-clamp-hold-down-files-with; pp. 1-14; Brooklyn, NY.
JP Leathercraft; CNC Toe Push Side Clamp Kit Hobby Machines 3D Printed Black Shapeoko X; https://jpleathercraft.com/products/cnc-toe-push-side-clamp-kit-hobby-machines-3d-printed-black-shapeoko-x-carve-cnc4newbie-onefinity; pp. 1-4; Passaic, NJ.

* cited by examiner

*Primary Examiner* — Lee D Wilson

(74) *Attorney, Agent, or Firm* — Wolter Van Dyke Davis, PLLC; Robert L. Wolter

(57) ABSTRACT

An in-line clamp (100), including: a base (200) having a bottom (202) that defines a bottom plane (204) and a ramp feature (210); and a pusher (300) having a cooperating feature (304) and a contact ridge (314) disposed opposite the cooperating feature. Movement of the cooperating feature along the ramp feature moves the contact ridge downward toward the bottom plane and away from the base in a clamping direction (510). The clamping direction forms an acute clamping direction angle (514) with the bottom plane. An adjustment mechanism (500) is configured to apply a push force (322) on the pusher to move the contact ridge in the clamping direction. The push force is applied in a push force direction (322D) that forms an acute push force direction angle (508) with the bottom plane. The acute clamping direction angle is different than the acute push force direction angle.

20 Claims, 11 Drawing Sheets

IN-LINE CLAMP

FIELD OF THE INVENTION

The invention relates to in-line clamps that clamp a workpiece in place on a worktable.

BACKGROUND OF THE INVENTION

In-line clamps are used to clamp a workpiece securely on a worktable during operations such as drilling etc. In woodworking, known in-line clamps rely on dog holes in the worktable. These dog holes are typically spaced apart on the worktable by some distance, for example, four inches. This spacing limits the options for placing the in-line clamp. To accommodate the limited placement options, some in-line clamps use a long rod that can reach the workpiece. However, these long rods can flex when force is applied, and this flex can raise the workpiece off the worktable. Consequently, there remains room for improvement.

BRIEF DESCRIPTION OF THE DRAWINGS

The invention is explained in the following description in view of the drawings that show.

DETAILED DESCRIPTION OF THE INVENTION

Figure 1A:
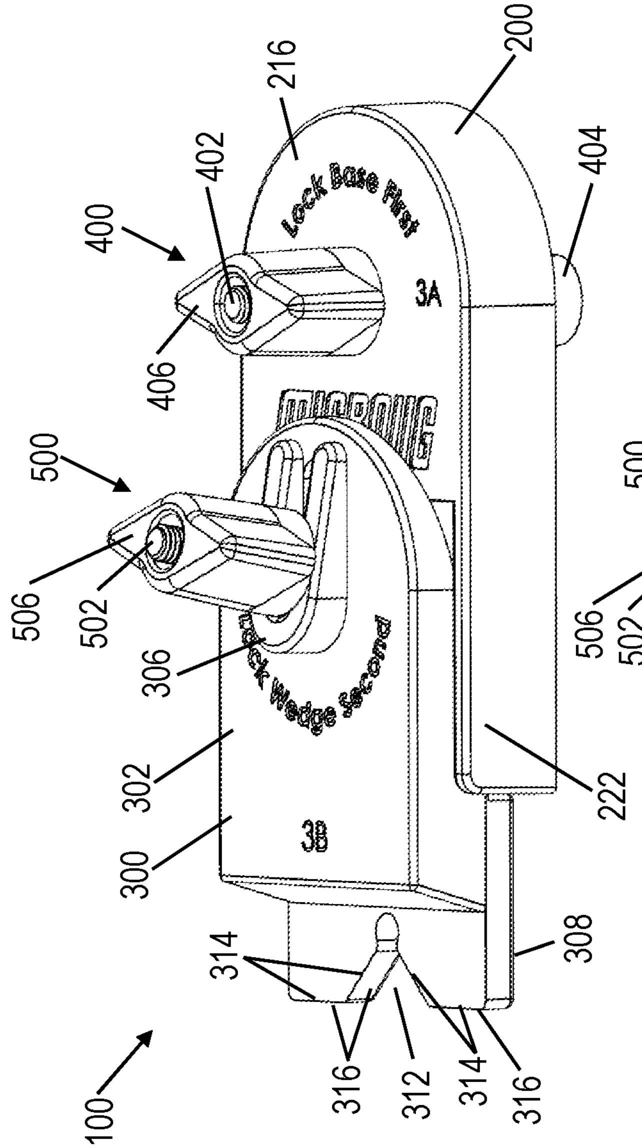
FIG. 1A and FIG. 1B are perspective views of an example embodiment of an in-line clamp disclosed herein in a retracted configuration and an extended configuration respectively.
Figure 1B:
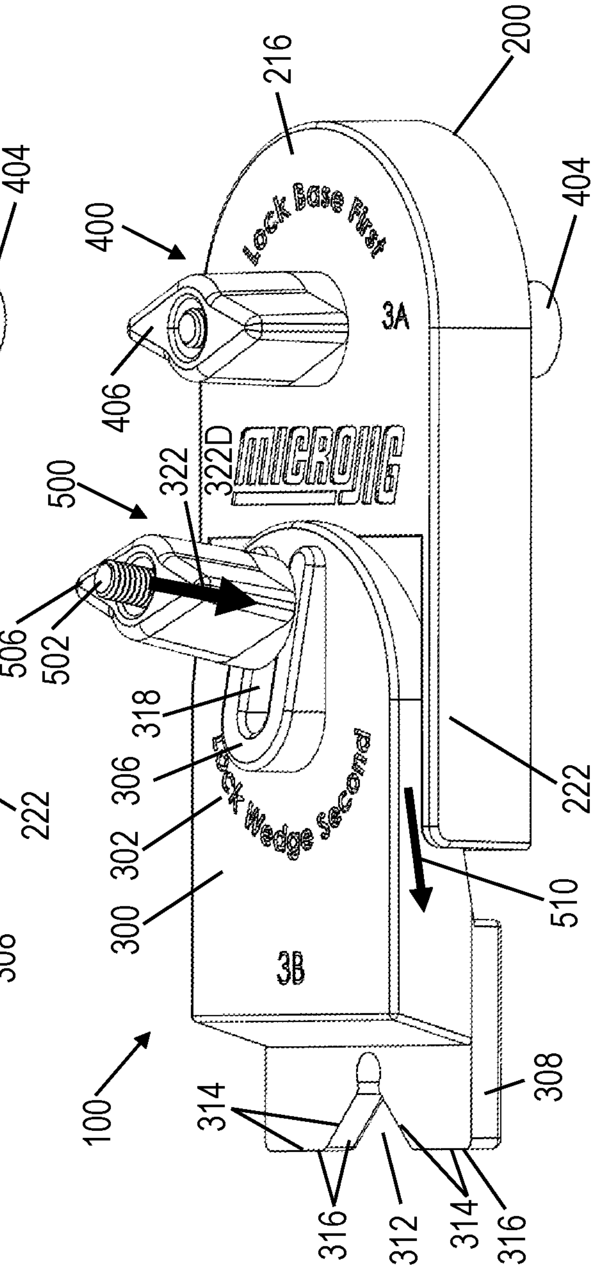
Figure 2:
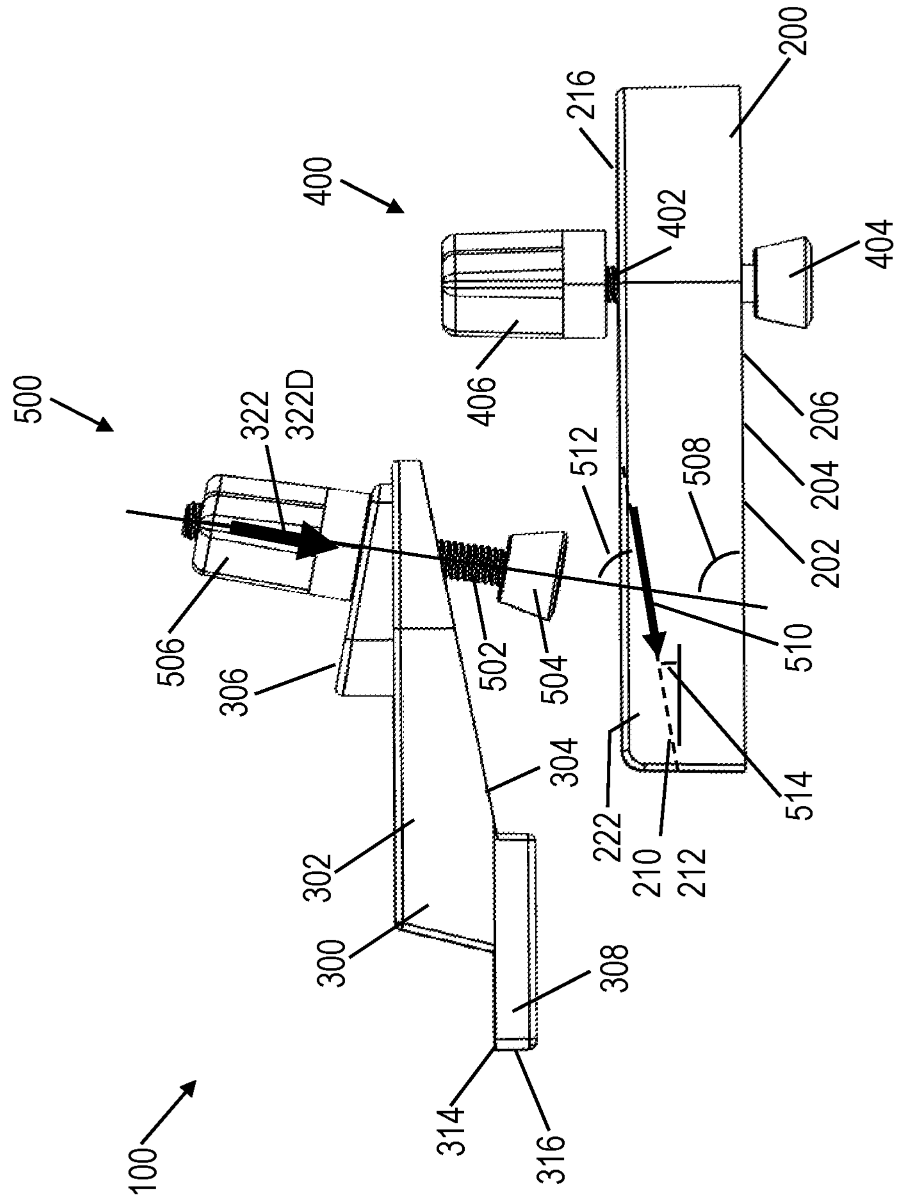
FIG. 2 is a side view showing an example embodiment of a base and an example embodiment of a pusher of the in-line clamp of FIG. 1A separated from each other.
Figure 3A:
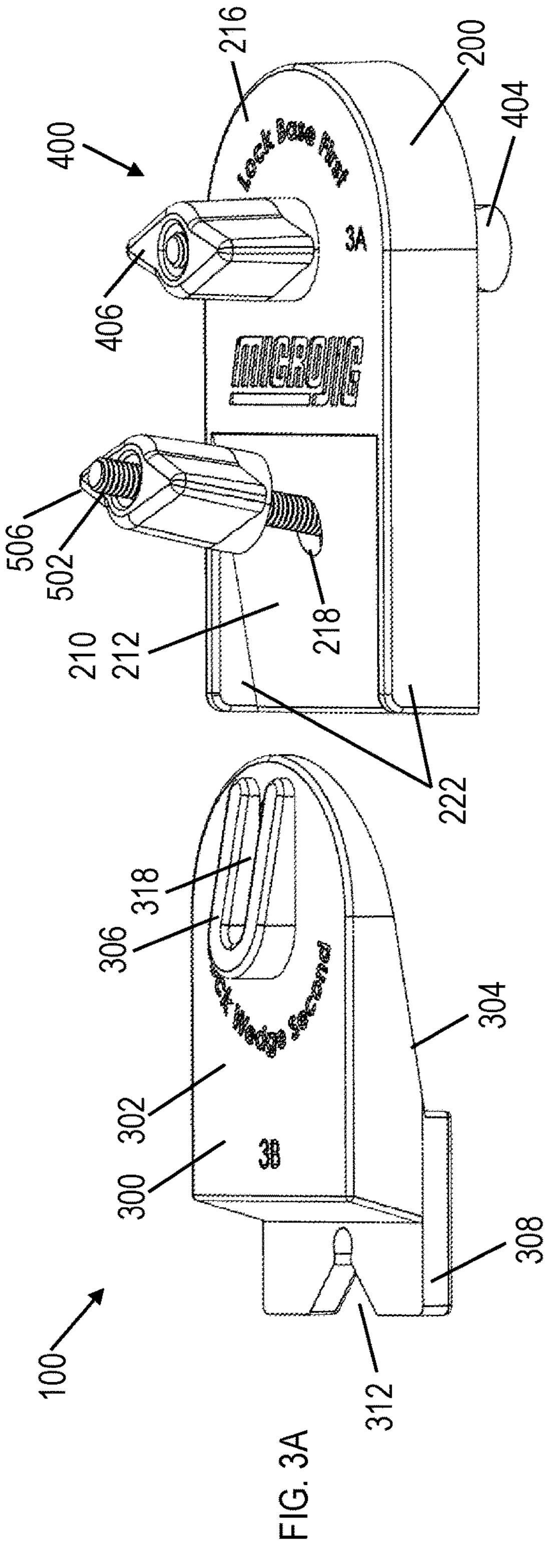
FIG. 3A and FIG. 3B are perspective views of showing the base and the pusher of the in-line clamp of FIG. 1A separated from each other.
Figure 3B:
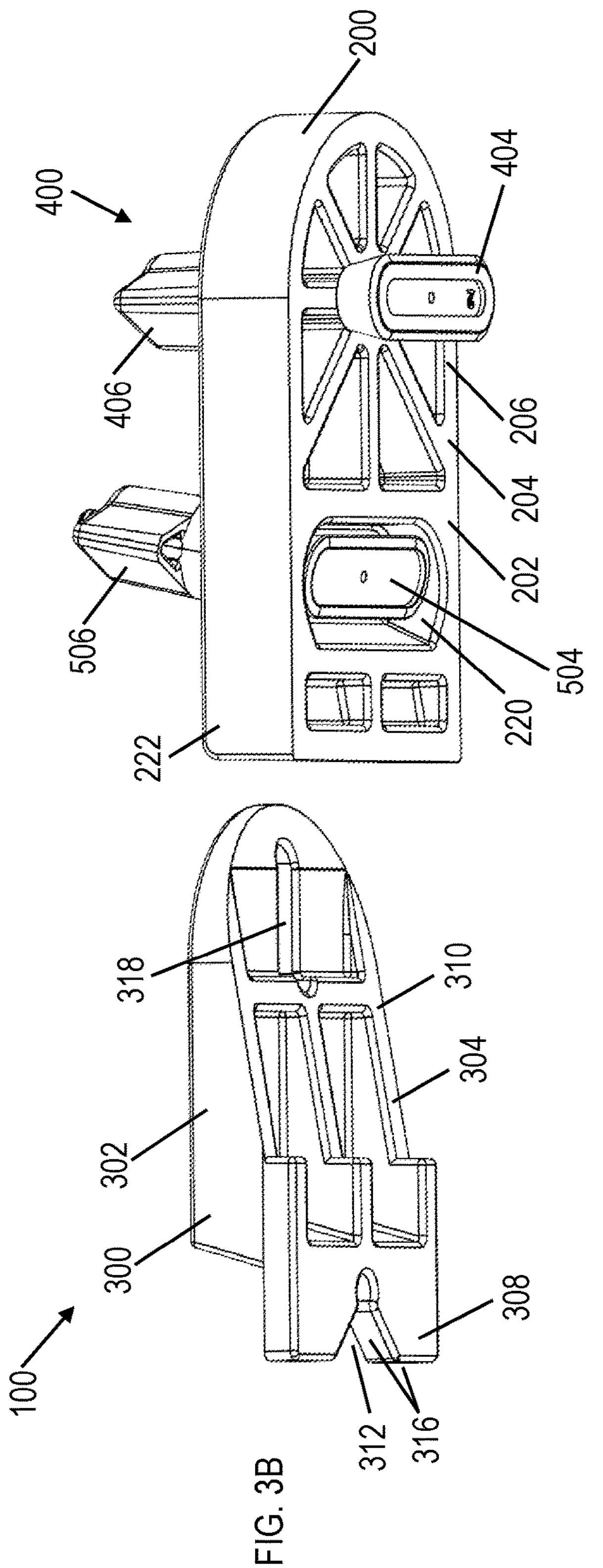
Figure 4:
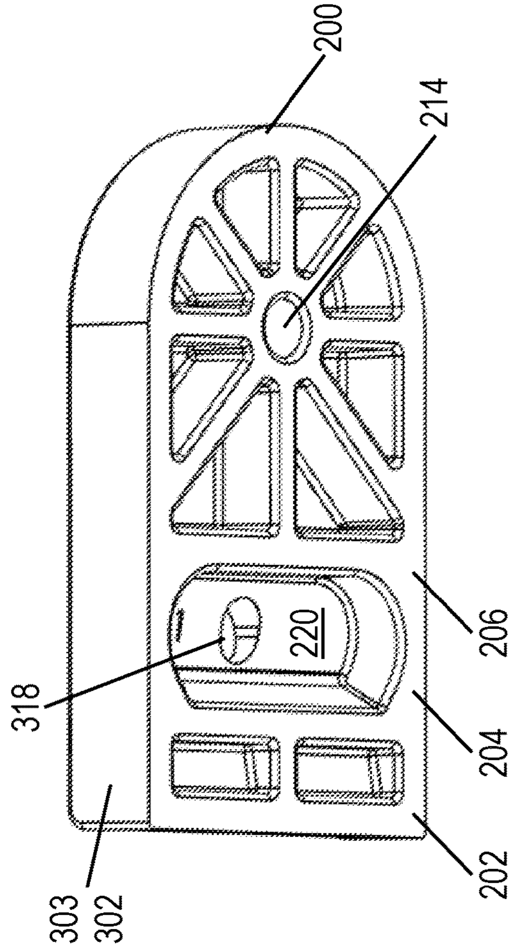
FIG. 4 is a lower perspective view of the base of FIG. 1A.
Figure 5:
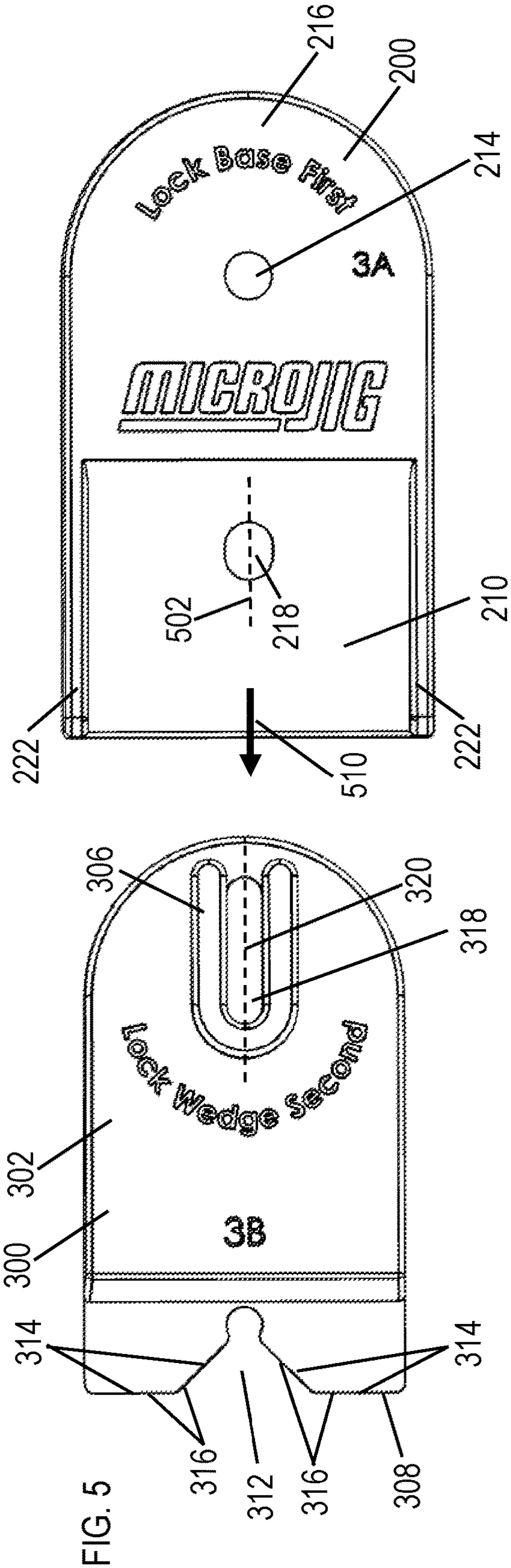
FIG. 5 is a top view showing the base and the pusher of the in-line clamp of FIG. 1A separated from each other.

The Inventor has devised a unique and innovative in-line clamp that improves the way a workpiece is held down on a worktable.

FIG. 1 to FIG. 5 show an example embodiment of an in-line clamp 100 disclosed herein. The in-line clamp 100 includes a base 200, a pusher 300, a securing mechanism 400, and an adjustment mechanism 500.

The base 200 includes a bottom 202 that defines a bottom plane 204. The bottom can have as few as three points of contact to define the bottom plane 204 and/or one or more flat surfaces 206 that define the bottom plane 204. The base 200 further includes a ramp feature 210 that is configured to provide an angled slide for the pusher 300. The ramp feature 210 in this example embodiment includes a flat surface 212 but can be embodied in a variety of ways.

The base 200 can be secured to the worktable in any number of ways. In this example embodiment, the base 200 can be secured to a worktable having dovetail slots via the securing mechanism 400. Other shaped slots can also be used, such as T-slots with T-bolts etc. Alternately, simply holes in the worktable can be provided as can any other suitable fastening arrangement.

The securing mechanism 400 includes a securing mechanism threaded rod 402 that extends through a securing mechanism hole 214 in the base 200. A securing mechanism dovetail nut 404 fits into a dovetail slot in the worktable and a securing mechanism tightening nut 406 abuts a top 216 of the base 200. Tightening the securing mechanism tightening nut 406 when the securing mechanism dovetail nut 404 is in the dovetail slot fixes the base 200 to the worktable so that the base 200 does not move relative to the worktable.

The pusher 300 includes a pusher body 302, a cooperating feature 304, a nut contact surface 306, and an extension 308 that is cantilevered from the pusher body 302 in a direction away from the base 200. The cooperating feature 304 is configured to cooperate with the ramp feature 210 to slide thereon. In this example embodiment, the cooperating feature 304 includes a flat surface 310 but can be embodied in a variety of ways. In this example embodiment, the cooperating feature 304 and the nut contact surface 306 form a wedge shape (see FIG. 2). The extension 308 includes a notch 312, a contact ridge 314, and a raked face 316 that tapers (back) towards the base 200 with increasing (downward) distance from the contact ridge 314.

The pusher 300 can be secured to the base 200 in a variety of ways. In the example embodiment shown, an adjustment mechanism 500 secures the pusher 300 to the base 200 and also drives the pusher 300 along the ramp feature 210, thereby adjusting a position of the pusher 300 relative to the base 200. The adjustment mechanism 500 includes an adjustment mechanism threaded rod 502 that extends through an adjustment mechanism slot 318 in the pusher 300 and an adjustment mechanism hole 218 in the base 200. An adjustment mechanism anchor nut 504 is fully disposed in an adjustment mechanism anchor nut recess 220 in the base 200. An adjustment mechanism adjustment nut 506 abuts the nut contact surface 306 on the pusher 300. In this example embodiment, the nut contact surface 306 is oriented perpendicular to the adjustment mechanism threaded rod 502. In an example embodiment where the adjustment mechanism threaded rod 502 is angled (acute angle 508) at from five (5) to fifteen (15) degrees from vertical, the nut contact surface 306 is angled at from five (5) to fifteen (15) degrees from horizontal.

In an alternate example embodiment, the adjustment mechanism anchor nut 504 can be dispensed with, leaving the adjustment mechanism threaded rod 502 that is secured, for example, directly to the base 200.

When viewed from the side, (see FIG. 2), the adjustment mechanism threaded rod 502 forms an acute angle 508 (the acute push force direction angle) with to the bottom plane 204. In an example embodiment, the acute angle 508 is from seventy-five (75) degrees to eighty-five (85) degrees, inclusive. In an example embodiment, the acute angle 508 is eighty (80) degrees.

The adjustment mechanism threaded rod 502 also forms a relatively smaller acute angle 512 with the ramp feature 210 and thereby also with a direction of travel 510 (the clamping direction), which is parallel to the ramp feature 210. In an example embodiment, the acute angle 512 is from sixty-five (65) degrees to seventy-five (75) degrees, inclusive. In an example embodiment, the acute angle 512 is seventy (70) degrees.

The ramp feature 210 forms an acute angle 514 (the acute clamping direction angle) with the bottom plane 204. In an example embodiment, the acute angle 514 is from five (5) degrees to fifteen (15) degrees, inclusive. In an example embodiment, the acute angle 514 is ten (10) degrees.

When viewed from the top, (see FIG. 5), the adjustment mechanism threaded rod 502 is aligned with the direction of travel 510 as well as with a long axis 320 of the adjustment mechanism slot 318. Tightening the adjustment mechanism adjustment nut 506 applies a push force 322 on the nut contact surface 306 of the pusher 300 in a push force direction 322D. Due to the acute angle 512, the push force 322 has at least a force component that is parallel to the direction of travel 510. This force component urges the pusher 300 along the ramp feature 210 along the direction of travel 510. When the pusher 300 is unobstructed, the push force 322 moves the pusher 300 downward and away relative to the base 200. In this example embodiment, the direction of travel 510 is parallel to the ramp feature 210.

A clamp force that is applied by the pusher 300 to a workpiece is the push force component that is parallel to the direction of travel 510, less friction between the pusher 300 and the base 200.

Movement of the pusher 300 along the direction of travel 510 may be guided by optional guides 222 disposed on the base 200.

Figure 6A:
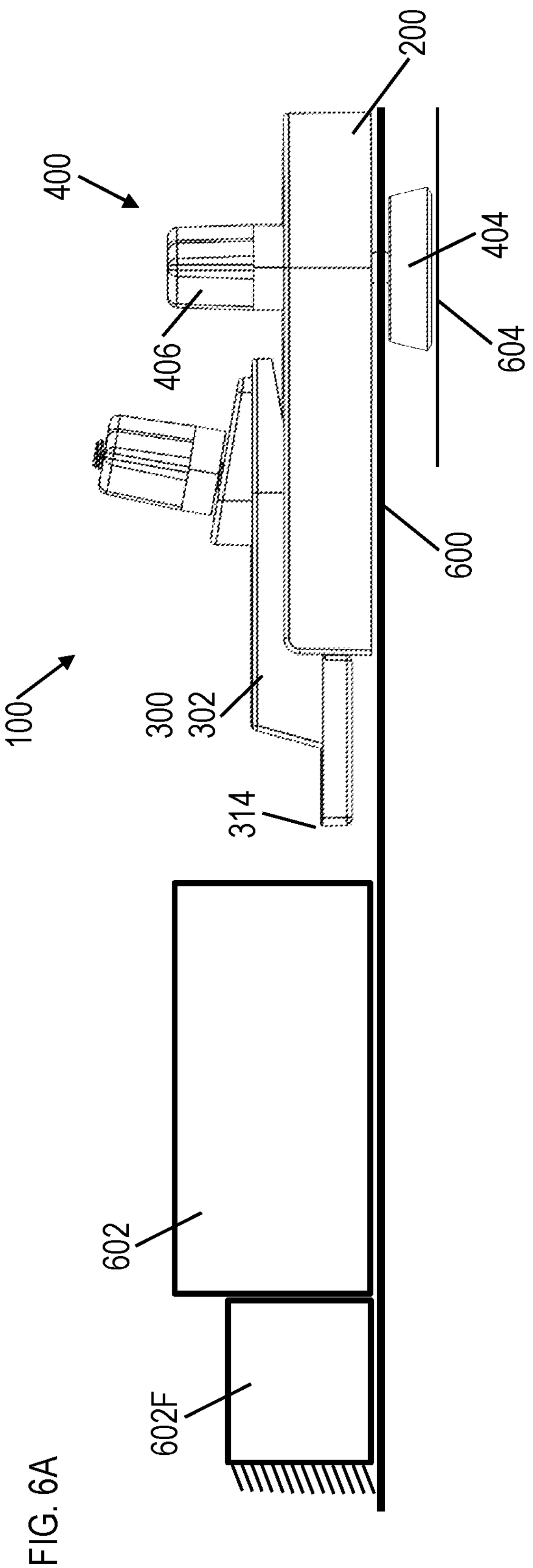
FIG. 6A is a side view showing the in-line clamp of FIG. 1A in the retracted configuration and adjacent a workpiece.

FIG. 6A shows the in-line clamp 100 in a retracted configuration and secured to a worktable 600 adjacent a workpiece 602. The workpiece 602 abuts a fixed element 602F that is held in a fixed position relative to the worktable 600. The worktable 600 includes a dovetail slot 604 recessed therein, running left/right in FIG. 6A, and into which the securing mechanism dovetail nut 404 has been placed. The securing mechanism tightening nut 406 has been tightened to snug the securing mechanism 400, which fixed the base in position relative to the worktable 600. The left/right orientation of the dovetail slot 604 allows for an infinite number of positions at which the in-line clamp 100 can be secured relative to the workpiece 602. This represents a significant improvement over the limited placements options when using the dog holes of the prior art. In addition, because the in-line clamp 100 can be placed relatively close to the workpiece 602, the pusher 300 can be relatively short compared to the long arms of the prior art. Because it is relatively shorter, the pusher 300 will tend to flex less, which improves the clamping action. The securing mechanism dovetail nut 404 can alternately be positioned in any dovetail slots that are oriented transverse to the dovetail slot 604.

Figure 6B:
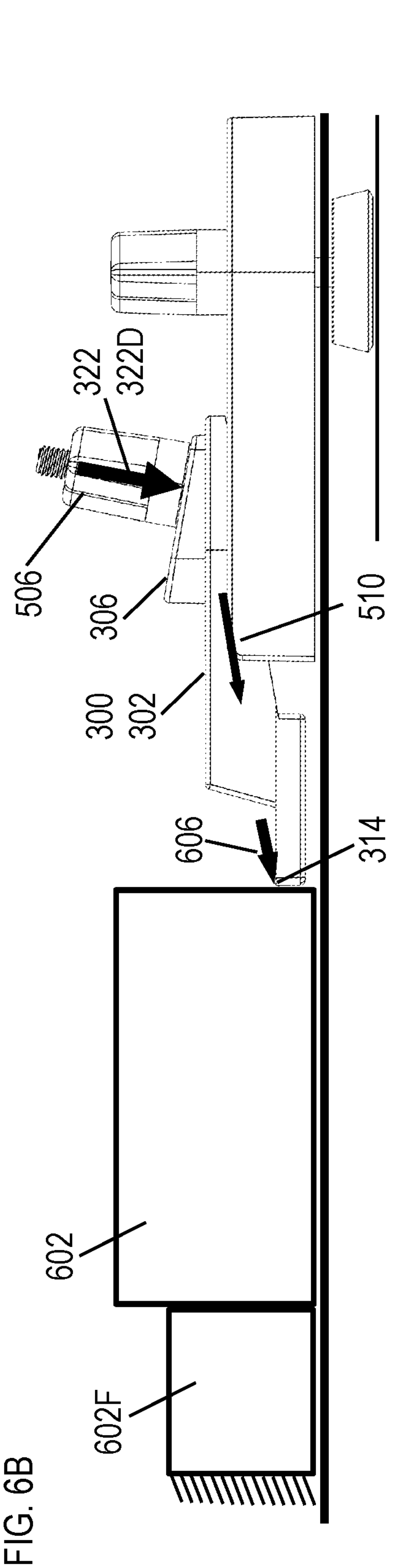
FIG. 6B is a side view showing the in-line clamp of FIG. 1A in the extended configuration and clamping the workpiece.

FIG. 6B shows the in-line clamp 100 in the extended configuration and clamping the workpiece 602. In this example embodiment, to reach the extended configuration, the adjustment mechanism adjustment nut 506 is turned clockwise on the right-hand thread of the adjustment mechanism threaded rod 502. This applies the push force 322 to the pusher 300, which causes the pusher 300 to move in the direction of travel 510 until the contact ridge 314 comes into contact with the workpiece 602. Upon contact with the workpiece 602, the push force creates the clamp force 606 that is applied by the contact ridge 314 to the workpiece 602. The clamp force 606 can be increased to a desired level by increasing the push force 322, which is accomplished simply by further clockwise adjustment of the adjustment mechanism adjustment nut 506. The clamp force 606 can be decreased by turning the adjustment mechanism adjustment nut 506 counterclockwise. This adjustment process can be repeated as needed until the desired clamp force is achieved.

Figure 7:
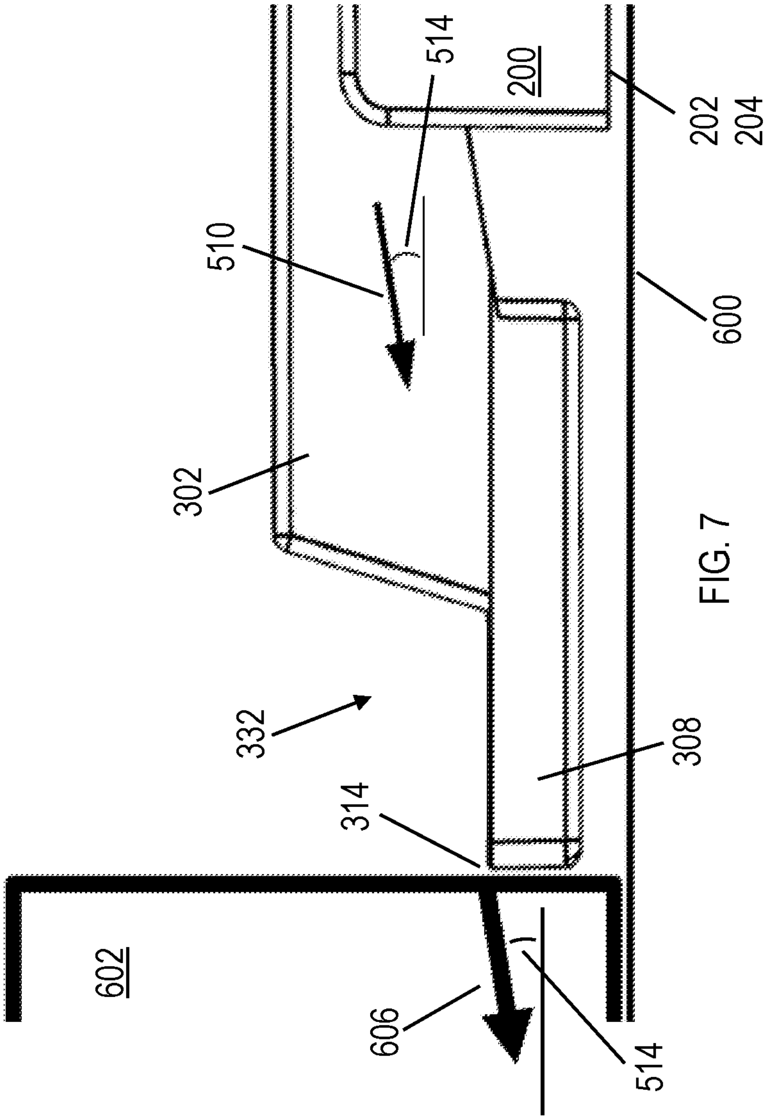
FIG. 7 is a close-up of FIG. 6B.

FIG. 7 is a close-up of FIG. 6B showing the contact ridge 314 contacting the workpiece 602 and imparting the clamp force 606. The direction of travel 510 is oriented at the acute angle (the acute clamping direction angle) with the bottom 202 of the base 200. Since the bottom 202 of the base 200 rests flat on the worktable 600 as does the workpiece 602, the clamp force 606 is imparted to the workpiece 602 at the same acute angle 514 relative to the worktable 600. The clamp force 606 thereby exerts both a sideways/lateral force component away from the base 200 and a downward force component. This downward force pushes the workpiece 602 downward onto the worktable 600. This, in turn, provides improved stability of the arrangement.

The pusher 300 also includes a recess 332 over the extension 308. The recess 332 provides a relief for a CNC tool or the like that travels past the edge of the workpiece 602 and over the pusher 300. This enables the tool to travel along its tool path without risking colliding with the pusher 300.

Figure 8:
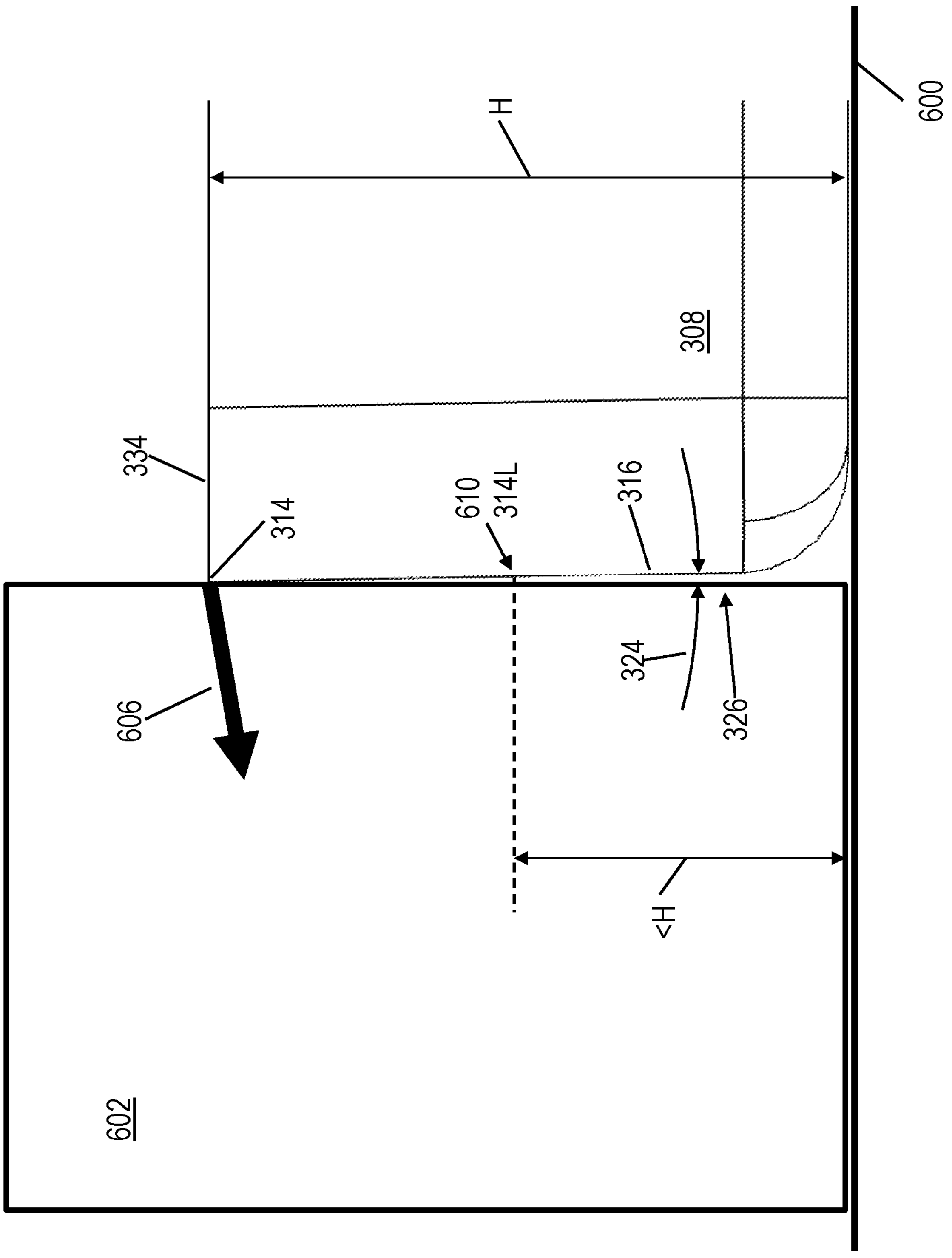
FIG. 8 is a close-up of FIG. 7.

FIG. 8 is a close-up of FIG. 7 of FIG. 7, also showing the contact ridge 314 contacting the workpiece 602 and imparting the clamp force 606. The rake of the raked face 316 can be seen here. A rake angle 324 tapers the raked face 316 (back) toward the base 200 with increasing distance downward from the contact ridge 314. Raking the raked face 316 creates the contact ridge 314, and the contact ridge 314 provides improved grip on the workpiece 602 compared to an unraked/flat face. The rake angle 324 can be any suitable angle. The contact ridge 314 is thereby formed by the raked face 316 and an extension top surface 334 that is oriented at an acute angle with the raked race 316.

In an example embodiment, the rake angle 324 is three degrees, though the artisan understands that various other angles may be suitable. The rake also creates a gap 326 between the workpiece 602 and the raked face 316.

In an example embodiment, the raked face 316 has a height H. Workpieces with a height that is less than H will contact the raked face 316 below the contact ridge 314. However, they will contact the raked face 316 at their upper corner 610 which will define a respective contact line 314L for each thin workpiece. In addition, the rake will naturally tend to push the thin workpiece downward. The height H can be any suitable height. In an example embodiment, the height H does not exceed 5/16". In an example embodiment, the height H does not exceed 1/4".

Figure 9A:
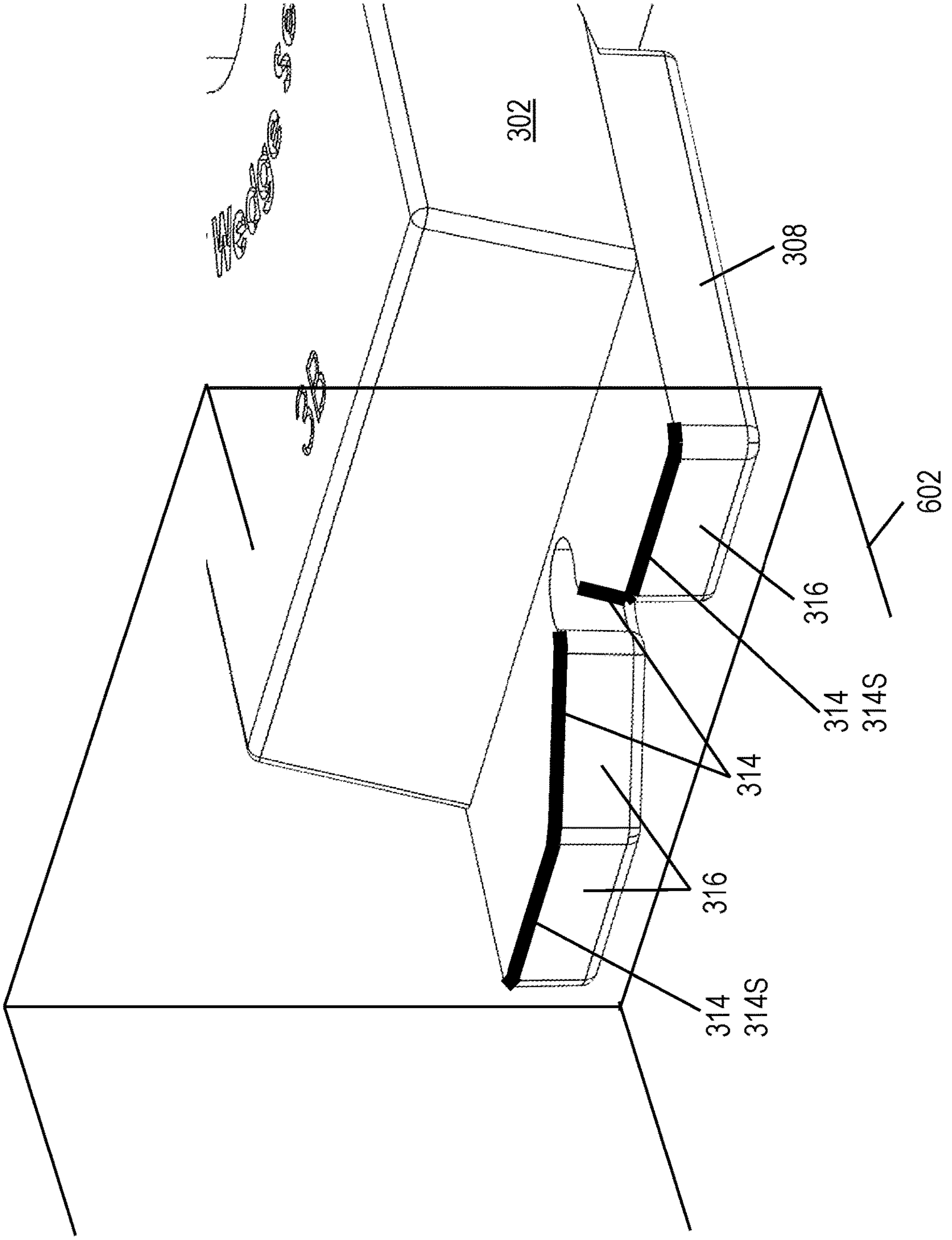
FIG. 9A is a perspective view showing an example embodiment of a straight portion of an example embodiment of a contact ridge of the in-line clamp of FIG. 1A contacting the workpiece.

FIG. 9A is a perspective view of FIG. 7 showing the contact ridge 314 made possible because of the raked face 316. The contact ridge 314 extends horizontally and has straight sections 314S that contact the flat side of the workpiece 602.

Figure 9B:
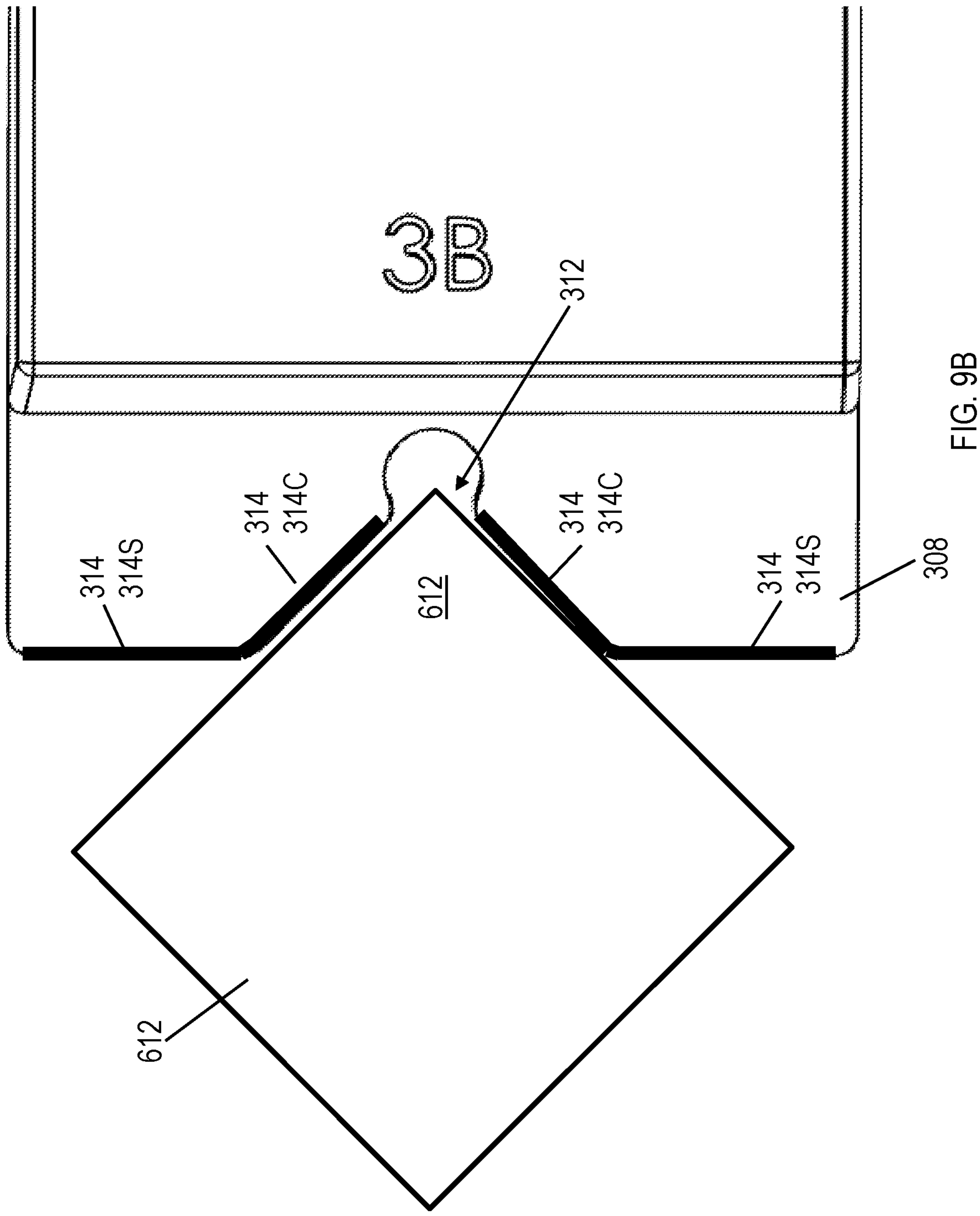
FIG. 9B is a top view showing an example embodiment of a concave portion of the contact ridge of FIG. 9 contacting a workpiece.

FIG. 9B shows the contact ridge from above. The extension 308 includes the notch 312 and the contact ridge 314 follows the notch 312. The contact ridge profile thereby includes a concave portion in this view. The notch 312 is configured to receive and cradle therein a corner 612 of a workpiece 602. Concave sections 314C of the contact ridge 314 contact the corner 612. In this example embodiment, the notch 312 has a shape that matches a ninety-degree corner. However, any notch shape that can accept any corner of a workpiece 602 is suitable.

Figure 10A:
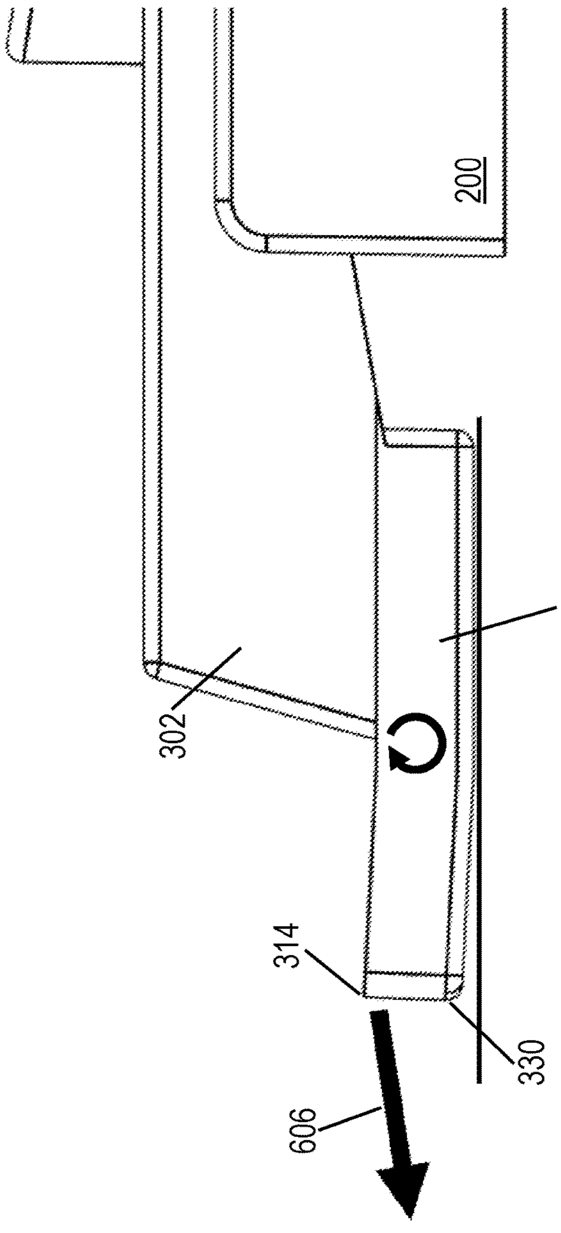
FIG. 10A is a side view showing flex of an example embodiment of an extension of the pusher of FIG. 1A.
Figure 10B:
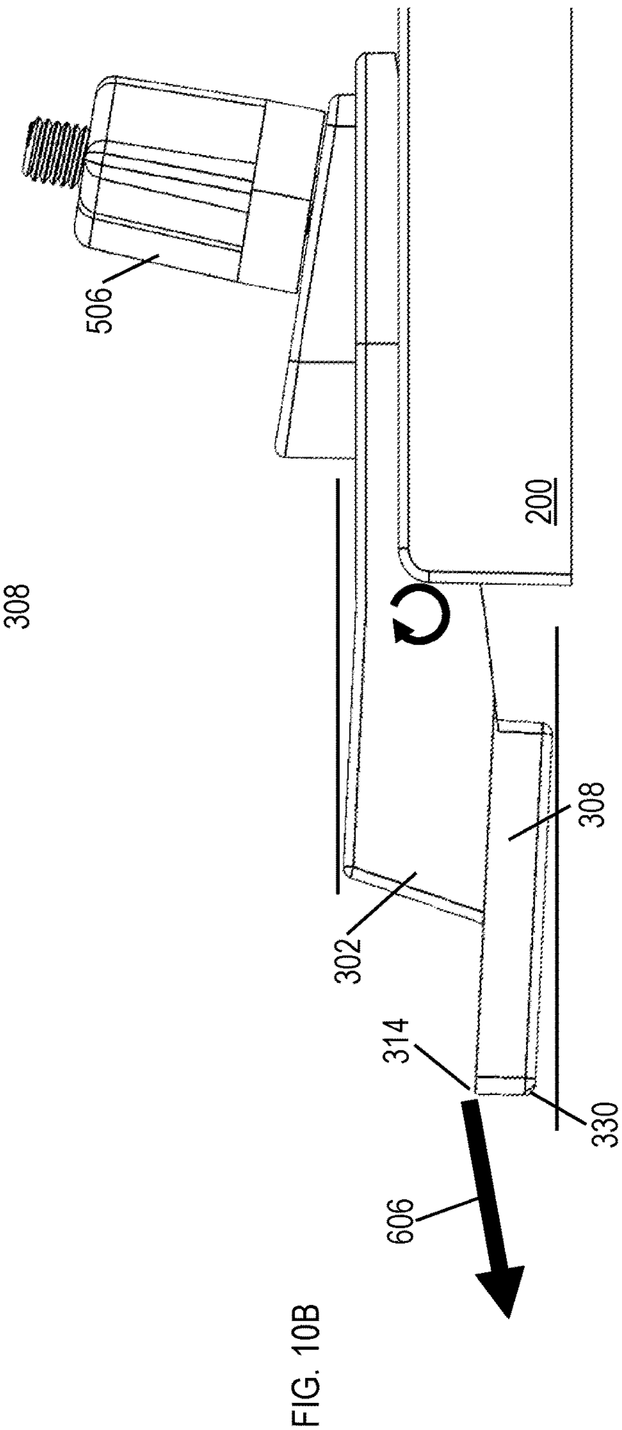
FIG. 10B is a side view showing flex of an example embodiment of a pusher body of the pusher of FIG. 1A.

FIG. 10A shows an exaggerated flex of the extension 308 made possible by the gap 326 between the workpiece 602 and the raked face 316. FIG. 10B shows an exaggerated flex of the pusher body 302 made possible by the gap 326. For each type of flex, when the contact ridge 314 flexes upward it allows a bottom corner 330 of the extension 308 to approach the workpiece 602. Up to a predetermined amount of flex, the bottom corner 330 does not contact the workpiece 602. This allows for increases in the clamp force while still maintaining the downward component of the clamp force on the workpiece 602 via the contact ridge 314. Reaching the predetermined amount of flex will simply bring the raked face 316 into flush contact with the workpiece, which flush contact is similar to known clamps. Further flexing will transfer the contact ridge to the bottom corner 330 of the extension 308. The transferred contact ridge will still provide the lateral and downward clamp forces that the contact ridge 314 provides. This flex can be enabled via using a resilient material such as a plastic material for the extension 308 and/or for the pusher body 302. Alternately, or in addition, this flex can be made possible via a localized spring or other resilient mechanism disposed, for example, where the circular arrows are located. Alternately, or in addition, a hinge type mechanism may be disposed, for example, where the circular arrows are located and oriented parallel to the straight sections 314S of the contact ridge 314.

Figure 11:
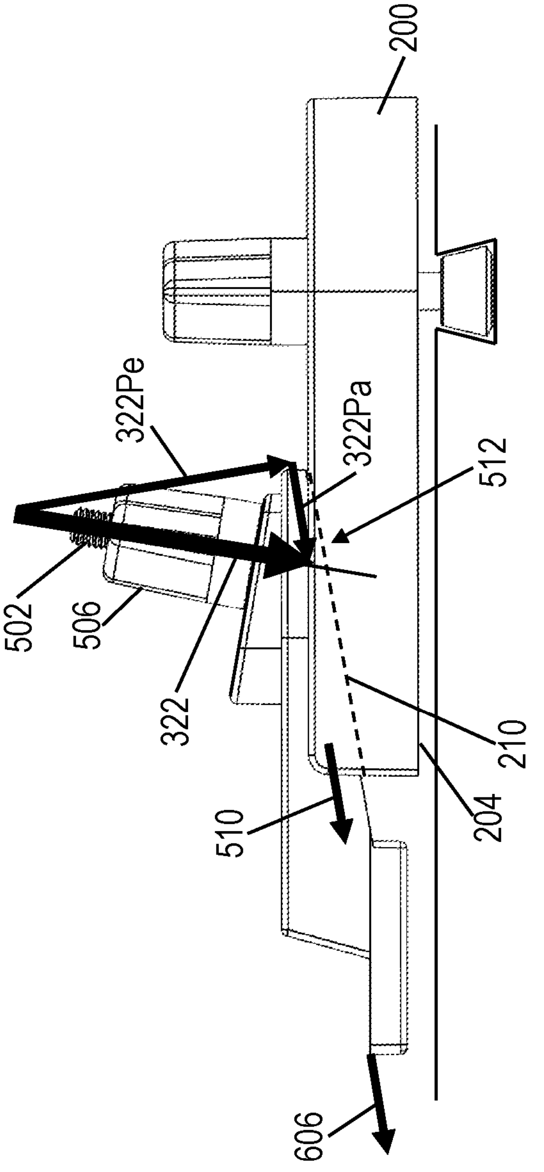
FIG. 11 is a side view showing forces generated by an example embodiment of an adjustment mechanism of the in-line clamp of FIG. 1A.

FIG. 11 is a side view showing forces generated by an example embodiment of an adjustment mechanism of the in-line clamp of FIG. 1A. The push force 322 is the force generated by the adjustment mechanism adjustment nut 506 on the pusher 300. The push force 322 includes a perpendicular force component 322Pe that is perpendicular to the ramp feature 210 and a parallel force component 322Pa that is parallel to the ramp feature 210. The clamp force 606 is the parallel force component 322Pa minus friction. Friction is proportional to the perpendicular force component 322Pe. Varying the acute angle 512 affects the forces and the acute angle 512 is selected to optimize the forces involved.

Figure 12A:
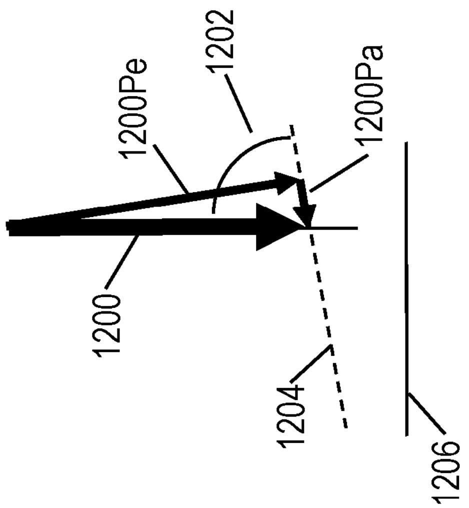
FIG. 12A to FIG. 12C are side views showing forces generated by different adjustment mechanisms.

FIG. 12A shows an arrangement where the adjustment mechanism threaded rod and its associated push force 1200 are disposed at an acute angle 1202 to the ramped feature 1204 that is larger than the acute angle 512 shown in FIG. 11 and which orients the adjustment mechanism threaded rod 502 perpendicular to the bottom plane 1206. This configuration increases the perpendicular force component 1200Pe, which increases friction between the base and the pusher, which reduces the clamp force that is applied. This also decreases the parallel force component 1200Pa, which further reduces the clamp force that is applied. The configuration disclosed herein and shown in FIG. 11 is thereby an improvement over the FIG. 12A configuration.

Figure 12B:
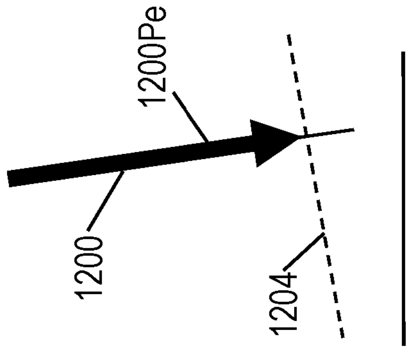

FIG. 12B shows an arrangement where the adjustment mechanism threaded rod and its associated push force 1200 are disposed perpendicular to the ramped feature 1204. The push force 1200 is thereby also the perpendicular force component 1200Pe, which increases friction. There is no parallel force component 1200Pa. With no parallel force component 1200Pa, this configuration cannot apply any clamp force. Any clamp force would need to be applied externally. The configuration disclosed herein and shown in FIG. 11 is thereby an improvement over the FIG. 12B configuration.

Figure 12C:
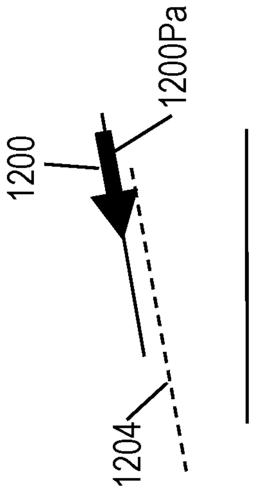

FIG. 12C shows an arrangement where the adjustment mechanism threaded rod and its associated push force 1200 are disposed parallel to the ramped feature 1204. The push force 1200 is thereby also the parallel force component 1200Pa. This maximizes the clamp force but provides no perpendicular force component 1200Pe. The perpendicular force component 1200Pe presses the pusher 300 on the base 200. Without it, the pusher 300 may tend to lift up and might lift the workpiece with it when the clamp force is applied to the workpiece. The configuration disclosed herein and shown in FIG. 11 is thereby an improvement over the FIG. 12C configuration as well.

The in-line clamp disclosed provides superior lateral and downward oriented clamp forces and does so with a simple, easy to use, and infinitely adjustable mechanism that can be placed nearly anywhere on a worktable relative to a workpiece. The in-line clamp thereby represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:

a base comprising a bottom that defines a bottom plane and a ramp feature;

a pusher comprising a cooperating feature and a contact ridge disposed opposite the cooperating feature;

wherein movement of the cooperating feature along the ramp feature moves the contact ridge downward toward the bottom plane and away from the base in a clamping direction, wherein the clamping direction forms an acute clamping direction angle with the bottom plane; and an adjustment mechanism configured to apply a push force on the pusher to move the contact ridge in the clamping direction, wherein the push force is applied in a push force direction that forms an acute push force direction angle with the bottom plane; wherein the acute clamping direction angle is different than the acute push force direction angle.

2. The apparatus of claim 1, wherein the contact ridge is formed by two surfaces disposed at an acute angle to each other.

3. The apparatus of claim 1, wherein the bottom comprises a flat contact surface that defines the bottom plane.

4. The apparatus of claim 1, wherein the base further comprises at least one guide rail astride the ramp feature to guide the pusher as the pusher moves along the ramp feature.

5. The apparatus of claim 1, wherein the adjustment mechanism further comprises: a threaded rod that is anchored to the base and oriented at the acute push force direction angle; and a nut; and wherein when advanced on the threaded rod the nut pushes on the pusher which thereby applies the push force to the pusher.

6. The apparatus of claim 5,
wherein the pusher comprises a nut contact surface on which the nut pushes when advanced; and
wherein the nut contact surface is oriented perpendicular to the threaded rod.

7. The apparatus of claim 1,
wherein the pusher further comprises an extension that cantilevers away from the base; and
wherein an upper corner of the extension forms the contact ridge.

8. The apparatus of claim 7,
wherein the extension comprises a vertical thickness not greater than 0.25 inches.

9. The apparatus of claim 1,
wherein the contact ridge comprises a horizontally extending recess configured to cradle therein a corner of a workpiece.

10. An apparatus, comprising:
a base comprising a bottom that defines a bottom plane and a ramp feature;
a pusher comprising a cooperating feature, an extension at a bottom of the pusher that cantilevers away from the base, a contact ridge disposed at an upper corner of the extension, and a raked surface that tapers toward the base from the contact ridge downward;
wherein movement of the cooperating feature along the ramp feature moves the contact ridge downward toward the bottom plane and away from the base in a clamping direction, wherein the clamping direction forms an acute clamping direction angle with the bottom plane; and
an adjustment mechanism configured to apply a push force on the pusher to move the contact ridge in the clamping direction, wherein the push force is applied in a push force direction that forms an acute push force direction angle with the bottom plane.

11. The apparatus of claim 10,
wherein the contact ridge is formed by two surfaces that form an acute angle with each other.

12. The apparatus of claim 11,
wherein the raked surface and a top of the extension constitute the two surfaces that form the contact ridge.

13. The apparatus of claim 10,
wherein the contact ridge extends horizontally and defines a concave shape along its horizontal extent.

14. The apparatus of claim 10,
wherein the base further comprises at least one guide rail astride the ramp feature to guide the pusher as the pusher moves along the ramp feature.

15. The apparatus of claim 10,
wherein the adjustment mechanism further comprises: a threaded rod that is anchored to the base and oriented at the acute push force direction angle; and a nut; and
wherein when advanced on the threaded rod the nut pushes on the pusher which thereby applies the push force.

16. The apparatus of claim 15,
wherein the pusher comprises a nut contact surface on which the nut pushes when advanced; and
wherein the nut contact surface is oriented perpendicular to the threaded rod.

17. An apparatus, comprising:
a base comprising a bottom that defines a bottom plane and a ramp feature;
a pusher comprising a wedge and a contact ridge disposed opposite the wedge, wherein the wedge comprises a nut contact surface over a cooperating feature;
wherein movement of the cooperating feature along the ramp feature moves the contact ridge downward toward the bottom plane and away from the base in a clamping direction; and
an adjustment mechanism comprising a threaded rod that is anchored to the base and oriented at an acute push force direction angle relative to the bottom plane and perpendicular to the nut contact surface; and a nut that when advanced on the threaded rod pushes on the nut contact surface which thereby applies a push force on the pusher to move the contact ridge in the clamping direction.

18. The apparatus of claim 17,
wherein the pusher comprises: an extension at a bottom of the pusher that cantilevers away from the base, wherein the contact ridge is disposed at an upper corner of the extension; and a raked surface that tapers toward the base from the contact ridge downward.

19. The apparatus of claim 18, wherein the contact ridge is formed by the raked surface and a top of the extension which form an acute angle with each other.

20. The apparatus of claim 19, wherein the contact ridge extends horizontally and defines a concave shape along its horizontal extent.

* * * * *